United States Patent
Schmid

(10) Patent No.: US 6,754,403 B1
(45) Date of Patent: Jun. 22, 2004

(54) ACOUSTO-OPTIC ADD/DROP MULTIPLEXER WITH RETRO-REFLECTION AND WAVELENGTH SELECTIVE OPTICAL CROSS-CONNECT

(75) Inventor: Steffen Schmid, San Donato Milanese (IT)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/868,874

(22) PCT Filed: Dec. 17, 1999

(86) PCT No.: PCT/EP99/10039
§ 371 (c)(1),
(2), (4) Date: Apr. 15, 2002

(87) PCT Pub. No.: WO00/39629
PCT Pub. Date: Jul. 6, 2000

Related U.S. Application Data
(60) Provisional application No. 60/115,633, filed on Jan. 12, 1999.

(30) Foreign Application Priority Data

Dec. 24, 1998 (EP) .............................................. 98124698

(51) Int. Cl.[7] .............................................. G02F 1/335
(52) U.S. Cl. ................. 385/7; 385/4; 385/11; 385/14; 385/18; 359/285; 359/305; 381/337; 372/13
(58) Field of Search .......................... 385/4, 7, 11, 14, 385/18; 359/285, 305; 381/337; 372/13; G02F 1/125

(56) References Cited
U.S. PATENT DOCUMENTS 5,002,349 A 3/1991 Cheung et al. ........... 350/96.13

5,218,653 A * 6/1993 Johnson et al. ............... 385/11
5,452,314 A   9/1995 Aronson ...................... 372/20

(List continued on next page.)

FOREIGN PATENT DOCUMENTS

| EP | 0 638 837 | 2/1995 | ............. G02F/1/31 |
| EP | 0 768 555 | 4/1997 | ............ G02F/1/125 |
| EP | 97113188.3 | 7/1997 | |
| EP | 0 805 372 | 11/1997 | ............ G02F/1/125 |
| EP | 0 814 364 | 12/1997 | ............ G02F/1/125 |
| EP | 98118377.5 | 9/1998 | |
| EP | 0 989 440 | 3/2000 | ............ G02F/1/125 |
| WO | WO 98/05133 | 2/1998 | ......... H04B/10/213 |
| WO | WO 99/06876 | 2/1999 | ............ G02F/1/125 |

OTHER PUBLICATIONS

Smith et al., "Technology and Applications of the Integrated Acousto–Optic Filter," Melecon 96–8th Edition, vol. 1, pp. 100–107 (May 1996).

Arecco, F. et al., "Acousto Optic Devices in Add/Drop Multiplexer Nodes," Proceedings of ECOC'98, pp. 117–118, (Sep. 1998).

*Primary Examiner*—Brian Healy
*Assistant Examiner*—Daniel Petkovsek
(74) *Attorney, Agent, or Firm*—Gregory V. Bean

(57) ABSTRACT

An acousto-optical add/drop multiplexer includes an acousto-optical switch including a first optical port coupled to a first polarization splitter, at least one polarization converter coupled between the first polarization splitter and a second polarization splitter, and second and third optical ports coupled to the second splitter. A first circulator is coupled to the first optical port, a mirror is coupled to the second optical port, and a second circulator is coupled to the third optical port. A wavelength selective optical cross-connect may be realized by coupling two such acousto-optical add/drop multiplexers by a single optical fiber to their respective third optical ports.

18 Claims, 9 Drawing Sheets

U.S. PATENT DOCUMENTS

| | | | |
|---|---|---|---|
| 5,611,004 A | 3/1997 | Chang et al. | 385/11 |
| 5,712,932 A | 1/1998 | Alexander et al. | 385/24 |
| 5,748,810 A * | 5/1998 | Schmid | 385/7 |
| 5,796,882 A * | 8/1998 | Schmid | 385/11 |
| 5,850,491 A * | 12/1998 | Morasca et al. | 385/7 |
| 5,850,492 A * | 12/1998 | Morasca et al. | 385/11 |
| 6,195,476 B1 * | 2/2001 | Schmid | 385/7 |
| 6,243,516 B1 * | 6/2001 | Seino | 385/47 |
| 6,252,698 B1 * | 6/2001 | Oikawa | 359/326 |
| 6,282,332 B1 * | 8/2001 | Bosso et al. | 385/7 |
| 6,357,913 B1 * | 3/2002 | Kim et al. | 383/28 |
| 6,400,881 B1 * | 6/2002 | Seino et al. | 385/130 |
| 6,437,888 B1 * | 8/2002 | Grasso et al. | 398/82 |
| 2001/0038728 A1 * | 11/2001 | Taylor et al. | 385/11 |

* cited by examiner

US 6,754,403 B1

ACOUSTO-OPTIC ADD/DROP MULTIPLEXER WITH RETRO-REFLECTION AND WAVELENGTH SELECTIVE OPTICAL CROSS-CONNECT

CROSS REFERENCE TO RELATED APPLICATIONS

This application is a national stage filing of International Application No. PCT/EPP99/10039, filed Dec. 17, 1999, which published in the English language, and claims the priority of EP 98124698.6 filed on Dec. 24, 1998, and the benefit of U.S. Provisional Application No. 60/115,633, filed on Jan. 12, 1999, which is incorporated by reference herein.

BACKGROUND OF THE INVENTION

The present invention relates generally to a double-passage acousto-optical device, that is, an acousto-optical device through which light passes twice, and specifically to various optical filters, wavelength add/drop devices, and optical cross-connects that are constructed using the double-passage optical device and methods for using them.

In optical filtering, double-stage optical filters are advantageous, because their filtering performance is increased compared to a single-stage filter having the same characteristics. Acousto-optical filters are known that provide for the interaction between light signals, propagated in waveguides formed on a substrate of birefringent and photoelastic material, and acoustic waves propagated on the surface of the substrate. The acoustic waves are generated by suitable transducers and are initially supplied by radio frequency signals.

The resonant (phase-matched) interaction between a polarized optical signal and an acoustic wave produces a wavelength-selective polarization conversion of the signal, in other words, a change of the polarization from its transverse electric TE component to its transverse magnetic TM component, which are orthogonal to each other, and vice versa. Following this interaction with the acoustic wave, the polarization components undergo not only the conversion to the corresponding orthogonal components, but also a frequency shift whose absolute value is equal to the frequency of the interacting acoustic wave (and therefore equal to that of the applied radio frequency signal). The sign of the frequency shift is a function of the state of polarization and of the direction of propagation of the acoustic wave with respect to the optical wave.

In such acousto-optical devices, by controlling the frequency of the optical and acoustic waves it is possible to tune the spectral response curve of the devices, which makes them suitable for being used as switches and as optical filters of the signals in optical telecommunications networks with wavelength-division multiplexing. These tunable switches and filters allow the selection of the signals to be changed and, thus, to reconfigure a network, without altering the cabling of the components.

These acousto-optical devices also allow the switching and simultaneous selection of different signals or channels, if the acoustic wave propagating at the surface of the substrate is the superimposition of different acoustic waves. In fact, the switches execute the combined switching of the signals at the wavelengths corresponding to the simultaneously applied frequencies and the filters have a pass band corresponding to the set of different wavelength intervals, determined by the frequencies of the acoustic waves.

As an example, EP 768555A1 in its FIG. 1 illustrates a 2×2 acousto-optical switch with a polarization independent response. The switch comprises a substrate 1 in a birefringent and photoelastic material, consisting of Lithium Niobate ($LiNbO_3$). Substrate 1 includes two polarization selective elements 2 and 3 and a conversion stage 4. The two polarization selective elements 2 and 3 are formed by polarization splitters in an optical waveguide, each comprising respective central optical waveguide portions 5 and 6 and optical waveguide input and output branches 7, 8, 9, 10 for splitter 2 and 11, 12, 13, 14 for splitter 3, respectively. The input branches 7 and 8 of splitter 2 are connected to input ports 71 and 81 of the switch through respective connecting optical waveguides 70 and 80. The output branches 13 and 14 of splitter 3 are connected to output ports 131 and 141 of the switch through respective connecting optical waveguides 130 and 140.

In practice these acousto-optical filters according to the description in EP 768555A1 comprise a waveguide chip of a length of about 65 mm, with optical guides 71, 81 and 131, 141 spaced apart by about 250 µm. Although FIG. 1 of EP 0768555 is not drawn to scale, optical guides 15 and 16 are typically spaced apart by about 270 µm. This distance includes polarization beam splitters/combiners (PBS) 5, 6. The end-faces are usually slant-polished (about 6°) to avoid any back-reflection from the end-faces. The wafer on which the device is realized has a 3-inch diameter, this dimension fixing the maximum length of the substrate 1 to about 60–65 mm.

EP 814364A1 describes a double-stage acousto-optical waveguide device. FIG. 12 in EP 814364A1 shows a switch, or add/drop node comprising, in addition to a third polarization conversion stage 303, a fourth polarization conversion stage 403. The fourth polarization conversion stage 403 is connected to an input polarization splitter 404 and to an output polarization splitter 405. In turn the splitter 405 is connected to the polarization splitter 204 by means of the connecting branch 210 and to the lateral waveguide 255. The ports 19, 20, 21 and 22 are connected to the line. The polarization splitter 404 is connected to input ports 25 and 26 through which the signals to be added or subtracted are introduced and signals to be added or subtracted are also introduced through the ports 23 and 24.

U.S. Pat. No. 5,452,314 describes an acousto-optical tunable filter with a pair of electrodes on opposite sides of the waveguide. The patent discloses the use of a voltage source in which an applied electric field controls the birefringence of the filter, and a tunable laser incorporating such an acousto-optical tunable filter. Suitably adjusting the potential applied by the voltage source results in suppression of sidelobes, correction of asymmetric sidelobes, and compensation for physical variations in the waveguide.

U.S. Pat. No. 5,002,349 and EP 805372 describe single converter acousto-optical tunable filters. The '349 patent discloses an acousto-optical converter that allows multiple stages of such converters so as to provide for two-stage zero-frequency shifted converters and filters, lasers using an acousto-optical filter as a tuning element, polarization-independent converters, and wavelength-division-multiplexing routing switches.

U.S. Pat. No. 5,611,004 discloses a polarization independent acousto-optical tunable filter (AOTF). The patent describes in its FIG. 6 an embodiment where two stages of signal filtering are realized with only one transducer 43 on the substrate 31. Additionally, polarizer beam splitters 40 and 41 and a Faraday rotator 65 are used in the optical chain. Two stages of filtering are realized by passing the incoming beam of light through the AOTF a first time, reflecting the beam of light off of a mirror 67 and then passing the beam of light through the same AOTF a second time. A band pass filtered representation of the original beam of light is obtained at a circulator output 71 of an optical circulator 69 located at the input of the embodiment.

EP Application 98118377.5 describes a double passage acousto-optical device including an acousto-optical filter having a first converter coupled between first and second optical ports, a second converter coupled between third and fourth optical ports, and an optical combination coupled between the second port and the third port and including an optical isolating element.

EP Application 97113188.3 describes an acousto-optical device including a substrate of a material capable of propagating a surface acoustic wave along a portion of the surface of the substrate, a transducer for generating the surface acoustic wave, an optical waveguide formed in a substrate, and an acoustic absorber surrounding the portion of the substrate.

U.S. Pat. No. 5,712,932 describes optical cross connects for routing optical traffic between transmission paths in a wavelength-division-multiplexed optical communication system. The cross-connect switches in the '932 patent use Bragg grating filters.

Applicants have discovered that conventional double-stage acousto-optical devices require excessive substrate size and incur signal losses in their arrangement as add/drop multiplexers or wavelength selective cross-connects. The larger wafer size and additional connections and losses leads to unnecessary complexity and cost for wavelength selection using acousto-optical techniques.

SUMMARY OF THE INVENTION

Applicants have discovered that add/drop multiplexers and optical cross-connect switches that use acousto-optical devices can have smaller wafer size, shorter length, fewer optical fiber connections and better performance than that used in conventional devices.

In one aspect, an acousto-optical add/drop multiplexer consistent with the present invention includes an acousto-optical switch on a birefringent and photoelastic substrate, the acousto-optical switch having a first optical port coupled to a first polarization splitter, first acousto-optical polarization conversion region including a first optical waveguide branch optically coupled between the first polarization splitter and a second polarization splitter, second acousto-optical polarization conversion region including a second optical waveguide branch optically coupled between the first polarization splitter and the second polarization splitter, and second and third optical ports coupled to the second polarization splitter. The multiplexer Includes a first circulator having an input port a switch port coupled to the first optical port, and an output port. A reflecting device is coupled to the second optical port of the switch.

Preferably, the multiplexer further includes a second circulator having a filter port coupled to the third optical port, a drop port and an add port.

Preferably, the first polarization splitter has cross and bar transmission respectively for orthogonal polarization components of received light.

Preferably the second polarization splitter has cross and bar transmission respectively for orthogonal polarization components of received light.

In an embodiment, the multiplexer also includes a polarization-mode-dispersion compensator coupled between the reflecting device and the second optical port of the switch. Preferably, the polarization-mode-dispersion compensator is a birefringent element, such as one of a polarization-maintaining fiber, and a birefringent crystal. Attentively, the polarization-mode-dispersion compensator comprises a Faraday rotator or a quarter wave plate.

In an alternative embodiment, a first polarization-mode-dispersion compensator is coupled between the filter port of the second circulator and the third optical port of the switch, and a second polarization-mode-dispersion compensator is coupled between the switch port of the first circulator and the first optical port of the switch. Preferably, the first and second polarization-mode-dispersion compensators are one of a polarization-maintaining fiber and a birefringent crystal.

In another aspect, a wavelength selective optical cross-connect consistent with the present invention includes at least two acousto-optical switches, each including, on a birefringent and photoelastic substrate, a first polarization splitter, a wavelength-selective polarization conversion stage including first and second optical waveguide branches coupled between the first polarization splitter and a second polarization splitter, a reflecting device coupled to one arm of the second polarization splitter, and a circulator having an input port for receiving line channels, a switch port coupled to the first polarization splitter, and an output port. The cross-connect further includes an optical path coupling second arms of the second polarization splitters in the respective acousto-optical switches.

In yet another aspect, an acousto-optical waveguide device selective in wavelength consistent with the present invention includes a birefringent and photoelastic substrate, a wavelength-selective polarization conversion region including first and second acoustic waveguides and first and second optical paths, a first polarization splitter coupled between one end of the first and second optical paths and only a first optical interface for the device, and a second polarization splitter. The second polarization splitter has input arms coupled to an opposite end of the first and second optical paths, a first output arm coupled to a second optical interface for the device and a second output arm. The acousto-optical waveguide device further comprises a reflecting device coupled to the second output arm of the second polarization splitter.

In another aspect, a method of using an optical device includes providing a plurality of optical channels to an acousto-optical switch having a first polarization splitter and a polarization conversion stage connected between the first polarization splitter and a second polarization splitter, switching at least one of the optical channels to a first arm of the second polarization splitter and other of the optical channels to a second arm of the second polarization splitter, reflecting the other of the optical channels back through the switch via the second arm, adding to the first arm a new channel coinciding in wavelength with the at least one of the optical channels, and combining the new channel and other of the optical channels at an output of the switch coupled to the first polarization splitter.

According to a further aspect, a method of multiplexing optical channels according to the invention comprises the steps of: providing a line optical channel at a first wavelength to an acousto-optical switch having a first polarization splitter and a polarization conversion stage connected between the first polarization splitter and a second polarization splitter; switching said line optical channel to a first arm of the second polarization splitter; reflecting said line optical channel back through the switch via the first arm; adding to a second arm of the second polarization splitter a new channel at a wavelength different from said first wavelength; and combining the new channel and the line optical channel at an output of the switch coupled to the first polarization splitter.

According to still a further aspect, a method of dropping optical channels according to the invention comprises the steps of: providing a plurality of optical channels to an acousto-optical switch having a first polarization splitter and a polarization conversion stage connected between the first polarization splitter and a second polarization splitter; switching at least one of the optical channels to a first arm of the second polarization splitter and other of the optical channels to a second arm of the second polarization splitter; reflecting the other of the optical channels back through the switch via the second arm; dropping said at least one of the optical channels from said first arm of the second polarization splitter.

It is to be understood that both the foregoing general description and the following detailed description are exemplary and explanatory only and are not restrictive of the invention, as claimed. The following description, as well as the practice of the invention, set forth and suggest additional advantages and purposes of this invention.

BRIEF DESCRIPTION OF THE DRAWINGS

The accompanying drawings, which are incorporated in and constitute a part of this specification illustrate embodiments of the invention, and together with the description, explain the advantages and principles of the invention.

DETAILED DESCRIPTION OF THE PREFERRED EMBODIMENTS

Figure 1:
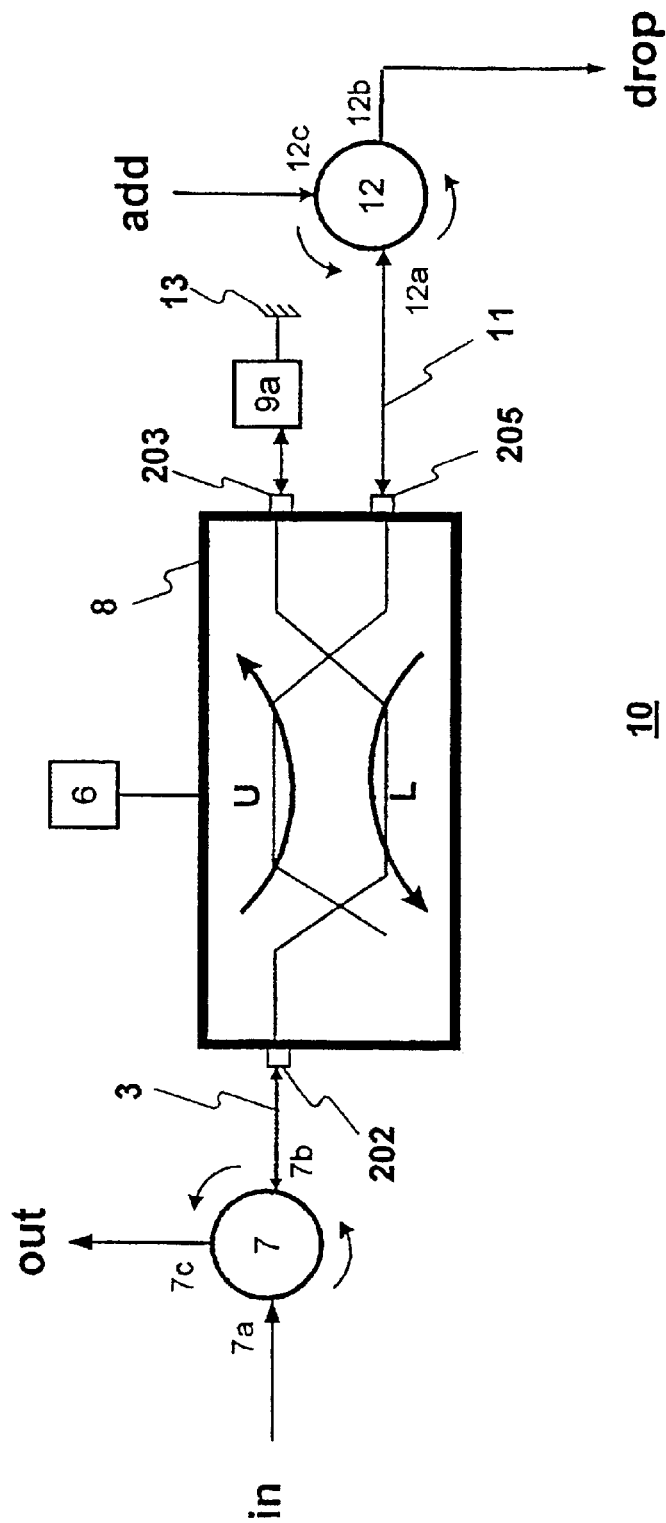
FIG. 1 is a schematic diagram of an add/drop multiplexer consistent with one embodiment of the present invention having a single-pass add and drop filter and a double-pass notch filter.

Reference will now be made to various embodiments according to this invention, examples of which are shown in the accompanying drawings and will be obvious from the description of the invention. In the drawings, the same reference numbers represent the same or similar elements in the different drawings whenever possible.

As generally illustrated in FIG. 1, a double-passage acousto-optical add/drop multiplexer 10 consistent with the present invention includes a substrate-mounted acousto-optical switch 8 having a first optical port 202 coupled to a first optical splitter, first and second polarization conversion regions optically coupled between the first optical splitter and a second optical splitter, and second and third optical ports 203 and 205 coupled to the second optical splitter. The multiplexer includes a first circulator 7 coupled to first optical port 202, a reflecting device 13 coupled to second optical port 203, and a second circulator 12 coupled to third optical port 205. By the term "coupled," it is meant that two physical devices are joined by a common optical path and possibly, although not necessarily, physically adhered. Applicants use the terms "coupled" and "connected" interchangeably in describing the invention, and those of skill in the art will appreciate that the various components identified herein need not be physically attached to each other to provide the optical coupling that assists in achieving the beneficial results of the invention.

Figure 2:
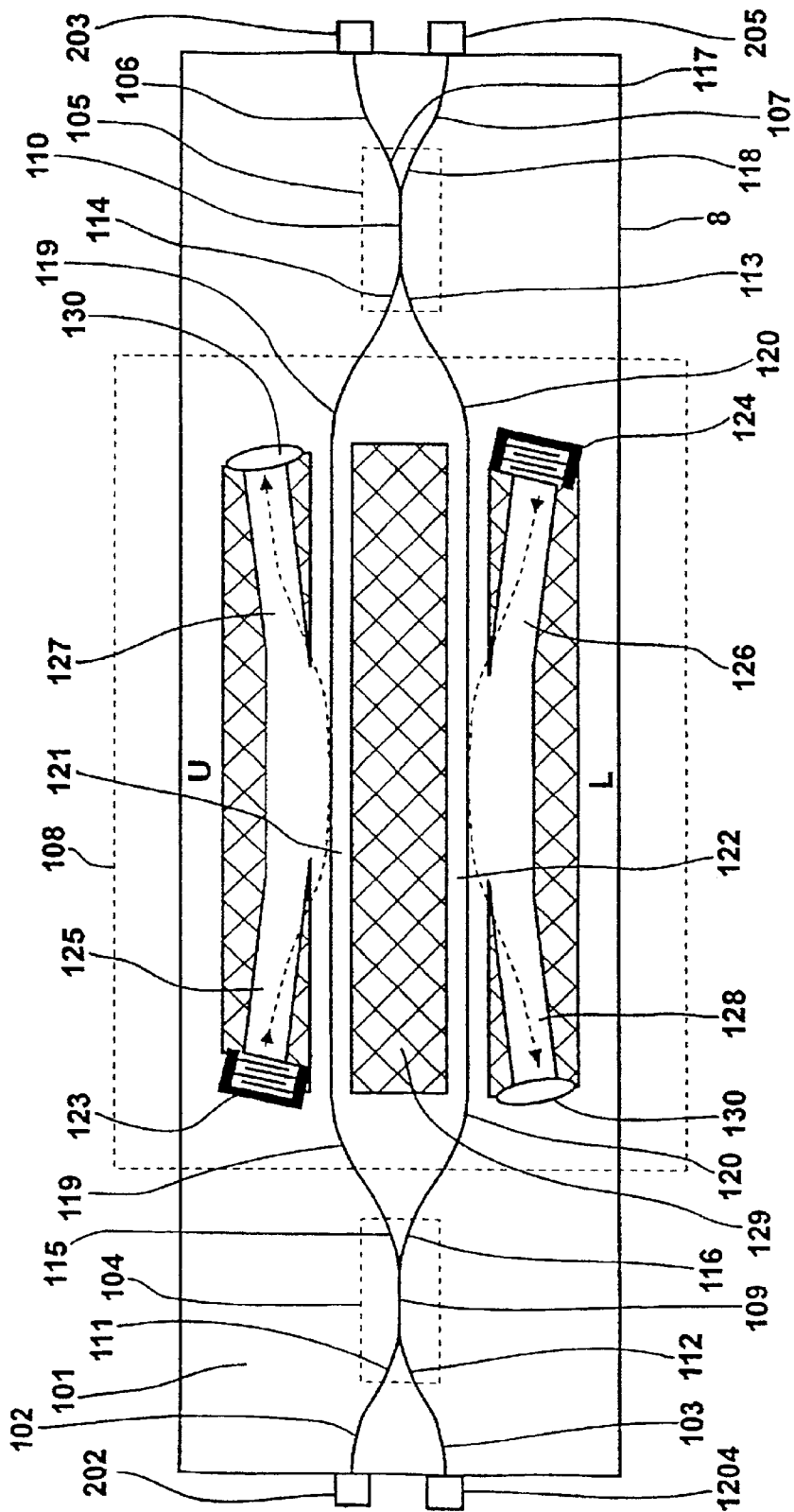
FIG. 2 is a schematic diagram of an acousto-optical switch for use in the add/drop multiplexers and optical cross-connects of the present invention.

FIG. 2 shows acousto-optical switch 8 within a substrate or chip 101. Substrate 101 for switch 8 comprises a chip made from birefringent and photoelastic material preferably of lithium niobate ($LiNbO_3$). Instead of $LiNbO_3$ another birefringent, photoelastic and piezoelectric material may be used, for example selected in the group $LiTaO_3$, $TeO_2$, $CaMoO_4$. Such materials exhibit two indices of refraction of different value, an ordinary one $n_o$ and an extraordinary one $n_e$. Thus, the optical signals, having generic polarization, that pass through these devices are subjected to a split into two orthogonal polarization components that propagate one with the ordinary indices of refraction $n_o$ and the other with the extraordinary index of refraction $n_e$.

In general, acousto-optical switch 8 is a 2>2 filter that is selective in respect of wavelength and has a response independent of polarization. Switch 8 can be used to select optical signals between the optical ports 202, 203, and 205 according to the wavelengths of the optical signals and the values of suitable control signals.

Optical waveguide branch 102, connected to the port 202, is formed in the substrate 101. Two selective polarization elements 104 and 105, a conversion stage 108, and two output optical waveguide branches 106 and 107, connected to the ports 203 and 205, are also formed in the substrate 101.

The selective polarization elements 104 and 105 preferably comprise polarization dividers, formed by zerogap wave directional couplers. These components can separate two corresponding polarizations supplied to a common input onto two output waveguides, and also combine two corresponding polarizations supplied to two separate input waveguides into a common output waveguide. In particular, each of polarization elements 104 and 105 comprises a central optical waveguide 109 and 110 respectively, and corresponding pairs of input and output waveguides 111, 112, 113, 114, 115, 116, 117, 118, respectively. These selective polarization elements are symmetrical; in other words their behavior does not change if the input optical waveguides are used as output guides and vice versa.

Conversion stage 108 within switch 8 comprises two conversion regions, referred to in the course of the present description as the upper converter U and the lower converter L. The upper converter U comprises an optical waveguide branch 119 connected to the output guide 115 of the polarization divider 104 and to the input waveguide 114 of the polarization divider 105. Upper converter U also comprises the acoustic waveguide 121. The lower converter L comprises an optical waveguide branch 120 connected to the output guide 116 of the polarization divider 104 and to the input waveguide 113 of the polarization divider 105. Lower converter L also is, comprises the acoustic waveguide 122.

An acoustic central cladding 129 separates acoustic waveguides 121 and 122. Two piezoelectric transducers, 123 and 124, which are connected to the radio-frequency generator 6 in FIG. 1 by means of a radio frequency splitter (not shown), are formed by a pair of interdigitated electrodes. Transducers 123 and 124 can generate a surface acoustic wave at radio frequency and are positioned within acoustic waveguides 125 and 126, respectively. Acoustic waveguides 125 and 126 communicate with acoustic waveguides 121 and 122, respectively, in such a way as to form acoustic couplers.

The acoustic waves generated by the electro-acoustic transducers 123 and 124 propagate along the corresponding parallel acoustic guides 121 and 122 in opposite directions and in such a way that they can interact with the electromagnetic waves that propagate in optical guides 119 and 120. The acoustic waves are then coupled to portions of acoustic guides 127 and 128, respectively. Acoustic absorbers 130 at the termination of acoustic guides 127 and 128 prevent reflection of the acoustic waves.

The operation of the integrated acousto-optical device 10 in FIG. 1 using switch 8 of FIG. 2 is based on the interaction between light signals, propagated in waveguides 119 and 120 formed on a substrate 101 of birefringent and photoelastic material, and acoustic waves propagated on the surface 121 and 122 of the substrate and generated by means of suitable transducers 123 and 124 supplied by radio-frequency signals from source 6. The interaction between a polarized optical signal and an acoustic wave produces a polarization conversion of the signal, in other words a change of the polarization from its TE (transverse electric) component to the TM (transverse magnetic) component, which are orthogonal to each other, and vice versa. Following this interaction with the acoustic wave, the polarization components undergo not only the conversion to the corresponding orthogonal components, but also a frequency shift. This shift has an absolute value equal to the frequency of the interacting acoustic wave (and therefore equal to that of the applied radio-frequency signal). As well, the frequency shift has a sign that is a function of the state of polarization and of the direction of propagation of the acoustic wave with respect to the optical wave. Table 1 summarizes these relationships.

TABLE 1

| | Propagation | |
|---|---|---|
| Polarization | Collinear | Contra-linear |
| TE | + | − |
| TM | − | + |

The radio frequency used to feed the two transducers within switch 8 is the same, so the frequencies of the acoustic wave, and the frequency shifts induced in the two converters, are the same magnitude. Both converted polarizations then, out of a single passage through the filter, show an equal frequency shift, $+f_{RF}$ or $-f_{RF}$, the sign depending on the port of input (port 203 for plus, port 202 or 205 for minus, referring to FIG. 2).

In these acousto-optical filters, it is possible to tune the spectral response curve by controlling the frequency of the acoustic waves, which enables the selection of the signals to be modified without changing the wiring of the components. These acousto-optical components can also be used to switch and simultaneously select radiation at various wavelengths, if the acoustic wave propagating on the surface of the substrate is the superimposition of different acoustic waves. Such switching and selecting can occur because the acousto-optical filter carries out the combined selection of the signals at the wavelengths corresponding to the frequencies applied simultaneously to the electrodes of the electro-acoustic transducers.

The selection of the wavelength for the device shown in FIG. 1, which uses, for example, the acousto-optical switch 8 shown in FIG. 2, will now be described in greater detail. For clarity of description, reference will be made to a particular example in which the polarization dividers 104 and 105 are of the type for which the incoming TE polarization, from any of the optical guides 111, 115, 116 and 113, 114, 117, 118, is transmitted along the optical waveguide corresponding to cross transmission (for example, for the divider 104, the cross transmission is 111→116), while the TM polarization is transmitted along the optical guide corresponding to bar transmission (for example, for the polarization divider 104 is 111→115). It will be evident to a person skilled in the art that this principle can be extended to the case in which the polarization dividers have the opposite behavior (bar transmission for TE polarization and cross transmission for TM polarization) to that described below.

As shown in FIG. 2, an acousto-optical switch 8 according to the present invention includes a polarization divider that couples to only one optical port for the switch. The polarization divider such as 104 in FIG. 2 has four arms 111, 112, 115, and 116. However, in a preferred embodiment, only optical port 202 of the switch 8 connects to polarization divider 104. The overall operation of the add/drop multiplexer of the present invention permits this arrangement as described below, which overcomes prior limitations on the spacing of optical waveguides feeding to optical ports in the acousto-optical switch. By having polarization divider 104 connect to only one optical port of the switch 8, the optical path comprising the waveguides 111 and 102 can be non S-shaped. That is, waveguides 111 and 102 may be arranged almost rectilinear in shape and shorter in length compared with conventional acousto-optical switches such as those described in EP 768555A1. Such an arrangement permits a decrease in size of the switch and an avoidance of crosstalk problems often found in conventional switches.

When an appropriate selection signal is applied to the electrodes of the transducers 123 and 124, the filter is switched to its on-state and changes to the cross transmission condition (cross-state) for the selected wavelengths. For this purpose, the transducers 123 and 124 generate surface acoustic waves at radio frequency with a drive frequency $f_{RF}$ (approximately 170±10 MHz for devices operating at approximately 1550 nm, and 210±10 MHz for those operating at approximately 1300 nm). The drive frequency corresponds to the resonant acoustical wavelength where polarization conversion TE→TM or TM→TE takes place for which the selection is required.

As shown in FIG. 1, the present invention includes an optical-circulator 7 coupled to optical port 202 for acousto-optical switch 8. One of ordinary skill in the art will recognize optical circulators as optical passive devices having multiple ports (three in the example of reference 7) that sequentially ordinate as shown in the following figures by an arrow. In general, the radiation entering one of the ports is transmitted towards only one of the other ports and, more particularly, the following one in accordance with the pre-established direction. Nevertheless, for the last port, according to the sequence, the entering radiation is not transmitted to a subsequent port. These type of circulators are commonly called open circulators. An optical circulator suitable to be used in the following embodiments is for example an E-TEK Model PIFC2TF341000 (four-port circulator) or Model PIFC2PR504000 (three-port circulator). However, equivalent devices will be apparent to those skilled in the art.

Instead, the so-called closed circulators permit the transmission, in a pre-established direction, between each port. Closed circulators can be also used by properly inserting isolators where required, e.g., by integration technique. However, devices equivalent to closed and open optical circulators can be realized by a suitable combination of optical isolators and optical couplers (e.g., conventional fused fiber couplers) as will be apparent to one of ordinary skill in the art.

In the following figures, the arrow shows the fixed direction and connects only the ports between which the transmission is possible.

Circulator 7 serves as a routing device for passing input optical signals between an external optical transmission system such as a wavelength-division-multiplexing system to switch 8. Circulator 7 preferably has three ports 7a, 7b, and 7c, where circulator ports 7a and 7c are coupled to selected lines in the external optical transmission system, and circulator port 7b is coupled to optical port 202 on acousto-optical switch 8. Preferably, an optical fiber 3 couples circulator 7 to switch 8 although one may employ alternative optical coupling techniques.

Light radiation that enters circulator port 7a passes through the circulator and exits at circulator port 7b. The light radiation present at the input fiber 3 enters the first input port 202 and reaches the polarization divider 104, where the polarization components TE and TM are separated and travel through the optical waveguide branches 116 and 115, respectively, shown in FIG. 2. The TE and TM components then propagate into the acousto-optical conversion stage along the optical fibers 120 and 119, respectively. The polarization components having wavelengths different from that desired as the output wavelength (selected by the radio-frequency generator 6, as described below) pass unchanged through the branches 120 and 119 of the conversion stage 108 and are then sent to the polarization divider 105 in which they are recombined. That is, the TM component of the input signal having wavelengths different from that selected in the acoustic waveguide 121 will pass in the bar state from waveguide 114 to waveguide 117 in polarization divider 105. Similarly, the TE component of the input signal having wavelengths different from that selected in the acoustic waveguide 122 will pass in the cross state from waveguide 113 to waveguide 117 in polarization divider 105. The radiation recombined in this way is sent in the waveguide 106 in such a way that it leaves the port 203 in unchanged form.

As shown in FIG. 1, the present invention includes a reflecting device 13 arranged in series with an optional polarization-mode-dispersion compensator 9a (described below) and coupled to optical port 203 of acousto-optical switch B. Reflecting device 13 is preferably a mirror or similar component that reflects substantially all wavelengths that it receives. In one embodiment, reflecting device 13 is an external fiber pigtail with a metallized end.

The recombined light that exits optical port 203 in switch 8 is returned by reflecting device 13 to port 203. Subsequently, the light entering port 203 passes back through switch 8 in the same order described above. In short, polarization divider 105 in FIG. 2 splits the TE component of the light in a cross state to optical waveguide 120 and splits the TM component in a bar state to optical waveguide 119. Again, the polarization components of the returning light that have wavelengths different from that selected by the radio-frequency generator 6 (as described below) pass unchanged through the branches 120 and 119 of the conversion stage 108 and are then sent to the polarization divider 104 in which they are recombined. That is, the TM component of the input signal having wavelengths different from that selected in the acoustic waveguide 121 will pass in the bar state from waveguide 115 to waveguide 111 in polarization divider 104. Similarly, the TE component of the input signal having wavelengths different from that selected in the acoustic waveguide 122 will pass in the cross state from waveguide 116 to waveguide 111 in polarization divider 104.

The recombined TE and TM components of the light signal not selected by radio frequency generator 6 exit optical port 202 of switch 8 and travel through fiber 3 to circulator 7. The light signal enters circulator port 7b and exits through circulator port 7c for transmission to an external optical communication system.

Consider, however, the polarization components of the input light signal that enter optical port 202 from circulator port 7b and have a wavelength among those desired as output wavelengths (and selected by radio frequency generator 6). As mentioned, polarization divider 104 separates the TE polarization components present at the first input port 202 to optical waveguide 120 and the TM polarization components to waveguide 119. The TE electromagnetic radiation is propagated along waveguide 120 in the opposite direction to that of the acoustic wave generated by the electro-acoustic transducer 124 and therefore, as shown in Table 1, it undergoes a frequency shift $-f_{RF}$ which is of negative sign.

RF generator 6 provides the drive frequency for both transducers 123 and 123 in a preferred embodiment of the present invention.

These TE polarization components that coincide with the predetermined wavelengths of the acoustic waveguide 122 are converted into the orthogonal TM polarization state along the optical waveguide 120. The TM radiation resulting from the conversion is transmitted by the polarization divider 105 to the optical waveguide 118 (bar transmission) and then to the optical port 205 through optical guide 107 of the acousto-optical switch 8.

Similarly, the TM polarization components of the light received at port 202 passes through acoustic waveguide 121, and those components with a wavelength corresponding to the wavelength selected by RF generator 6 within acoustic waveguide 121 undergo an orthogonal polarization shift to a TE state. The TM electromagnetic radiation is propagated along waveguide 119 in the same direction of the acoustic wave generated by the electro-acoustic transducer 124 and therefore, as shown in Table 1, it undergoes a frequency shift $-f_{RF}$ which is, again, of negative sign. Polarization divider 105 passes the converted TE mode components in a cross transmission to waveguide 118, where they combine with the TM polarization components from the lower converter L.

As before discussed, following the interaction with the acoustic wave, the polarization components at the selected wavelengths undergo not only conversion to the corresponding orthogonal components, but also a frequency shift.

Applicants have noted that this frequency shift is in the order of a few hundreds of MHz (e.g., about 170 MHz at 1550 nm, about 210 MHz at 1300 nm) and is very small compared to the frequency of the optical signals, hence only a negligible wavelength shift is introduced. Moreover, both polarization components have the same shift, therefore no disturbing beating is likely to occur if the polarization components get mixed downstream of the acousto-optical device.

As shown in FIG. 1, a preferred embodiment of the present invention includes a circulator 12, desirably an open circulator like the type described above for circulator 7, coupled to optical port 205 of acousto-optical switch 8. In particular, circulator 12 may be a three-port circulator having ports 12a, 12b, and 12c, where port 12a is coupled via an optional optical fiber 11 to port 205.

Optical signals that exit optical port 205, such as the switched frequencies from port 202, enter circulator port 12a. Circulator 12 then passes the received optical signal to port 12b for connection to an external telecommunication system, for example. As a result, RF signal generator 6 serves to select a particular frequency for separation from a spectrum of light radiation that enters acousto-optical switch 8 through optical port 202. As an example, acousto-optical switch 8 may function as at least a drop multiplexer for dropping a particular channel from a wavelength-division multiplexing system carrying a plurality of densely spaced channels at the input to port 202.

As well, acousto-optical switch 8 in the arrangement 10 of FIG. 1 may add channels to an external telecommunication system. In particular, an information-carrying channel corresponding to the conversion wavelength dictated by RF signal generator 6 may be added through circulator port 12c to an external system coupled to circulator port 7c. The added channel at the characteristic carrier wavelength is inserted to circulator port 12c and passes via circulator port 12a to optical port 205. In the manner described above, polarization divider 105 will send the TE polarization component in cross transmission through acoustic waveguide 121 via optical waveguide 119. Likewise, polarization divider 105 will send the TM polarization component in bar transmission through the lower converter L via optical waveguide 122. Because the added channel coincides with the selection performed by RF signal generator 6, upper converter U performs an orthogonal polarization shift TE→TM and lower converter L performs an orthogonal polarization shift TM→TE on the respective passing optical signals. Consequently, the TM component present at waveguide 115 and the TE component present at waveguide 116 combine within polarization divider 104 and exit acousto-optical switch 8 via port 202. Circulator 7 serves to route the added channel to an external optical system, for example, via output port 7c.

Applicants have made and tested a device 10 of the type of that of FIG. 1.

The extinction ratio in dB versus wavelength in nm at port 202 (notch output, i.e., relative transmission of the band-reject filter) has been measured for a switch 8 having a single-pass filter bandwidth of 2.2 nm.

Figure 8:
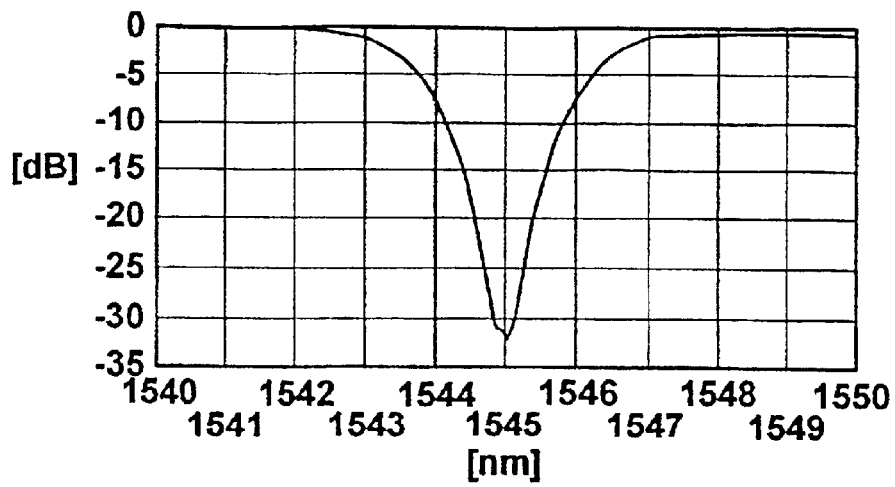
FIG. 8 is the relative transmission of the band-reject filter (notch output) measured for an add/drop multiplexer consistent with the embodiment of FIG. 1.

FIG. 8 shows that for the doublepass notch an extinction ratio of lower than −30 dB is achieved.

Applicants have tested the operation of device 10, in particular in view of determining its characteristics with regard to spacing of the input optical channels. It is known that, for acousto-optic filters, if the optical channels spacing is less than a limit value the acoustical signals interfere, introducing an amplitude modulation of the optical signal. This can result in a power-penalty in optical data transmission.

Figure 9A:
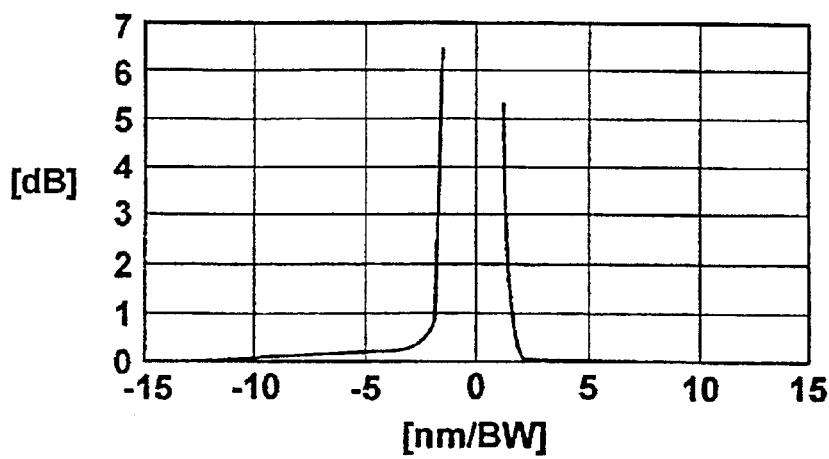
FIGS. 9A and 9B are respectively the power penalty and the notch characteristic in function of dropped channels distance measured for an add/drop multiplexer consistent with the embodiment of FIG. 1.

In FIG. 9A the power penalty (i.e., the increase of optical power at the receiver that is necessary for compensating the negative effect of amplitude modulation) is shown as a function of the channel distance of dropped channels, normalized to the filter bandwidth. For a channel distance of at least about twice the filter bandwidth the power penalty is significantly reduced, and is below a level of concern.

Figure 9B:
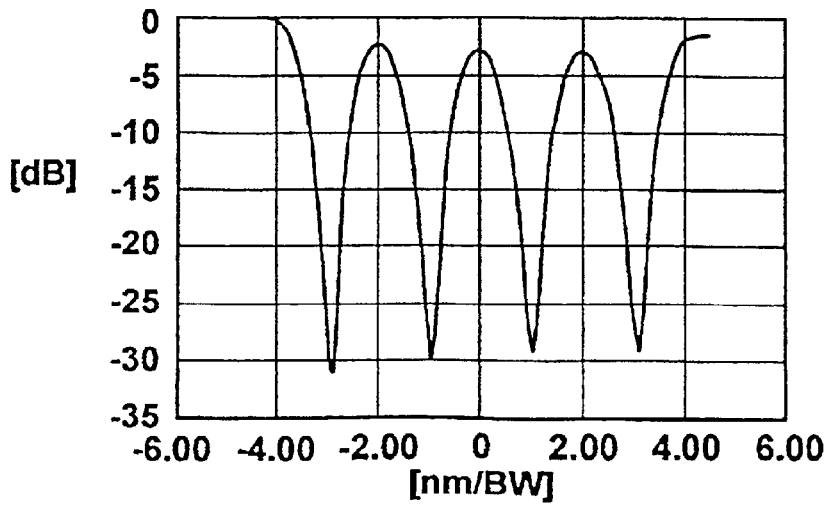

In addition, the notch characteristic (extinction ratio in dB) as a function of the channel distance normalized to the filter bandwidth, for four simultaneously dropped channels, has been measured and plotted in FIG. 9B.

This curve shows that also the notch depths remain of about −30 dB (in particular, lower than −29 dB) if the channels distance is at least about twice the filter bandwidth.

Figure 3:
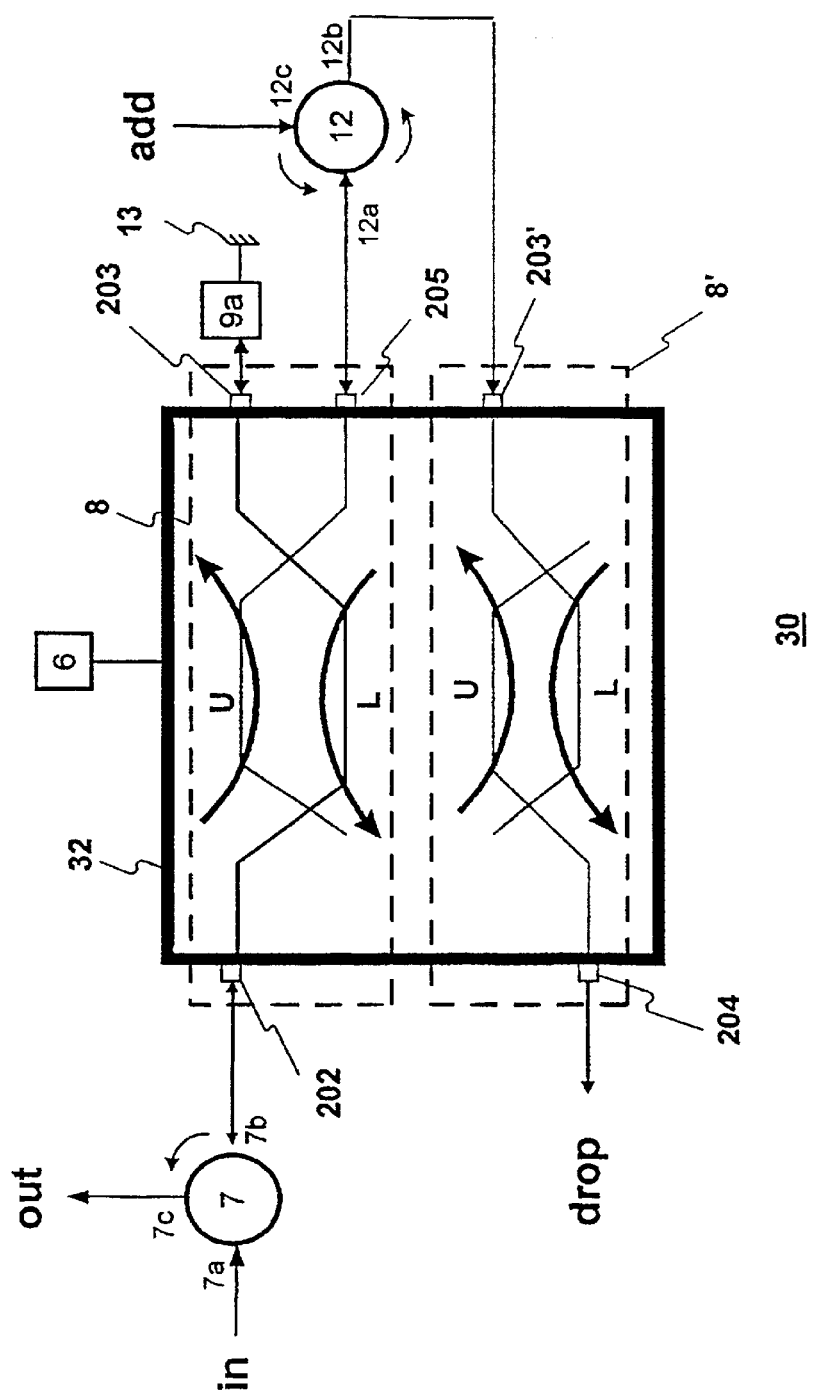
FIG. 3 is a schematic diagram of a wavelength selective optical cross-connect consistent with another embodiment of the present-invention having a single-pass add filter and a double-pass drop and notch filter.

FIG. 3 shows an alternative embodiment of the present invention with a combination of two add/drop multiplexers. The multiplexer of FIG. 3 provides double-stage filtering for both the line channels and the dropped channels, which can give high performance, for example, at 200 GHz channel spacing. Added channels undergo a single pass through the switch. In particular, multiplexer 30 includes a $LiNbO_3$ substrate 32 with two switches 8 and 8' integrated on the substrate. Of course, switches 8 and 8' may reside on separate substrates if desired. In this arrangement of FIG. 3, the dropped channels that exit circulator port 12b are routed to port 203' of the second switch 8'. In the same fashion as described for switch 8 in FIG. 1, switch 8' again converts the polarization of the dropped channels as they pass through the acoustic waveguides in switch 8' so that the TE and TM modes of these wavelengths are combined at output port 204 on the substrate 32. Port 204 may be coupled to an external optical communication system similar to circulator port 12b in FIG. 1.

The embodiment of FIG. 3 advantageously provides another frequency shift to the dropped channels of a value equal to that applied by switch 8 but with the opposite sign. As a result, the overall frequency shift $\Delta f_{tot}$ for the dropped channels with be zero, and the channels at port 204 from switch 8' will have wavelengths corresponding to the wavelengths of those same channels that entered switch 8 at port 202.

Figure 4:
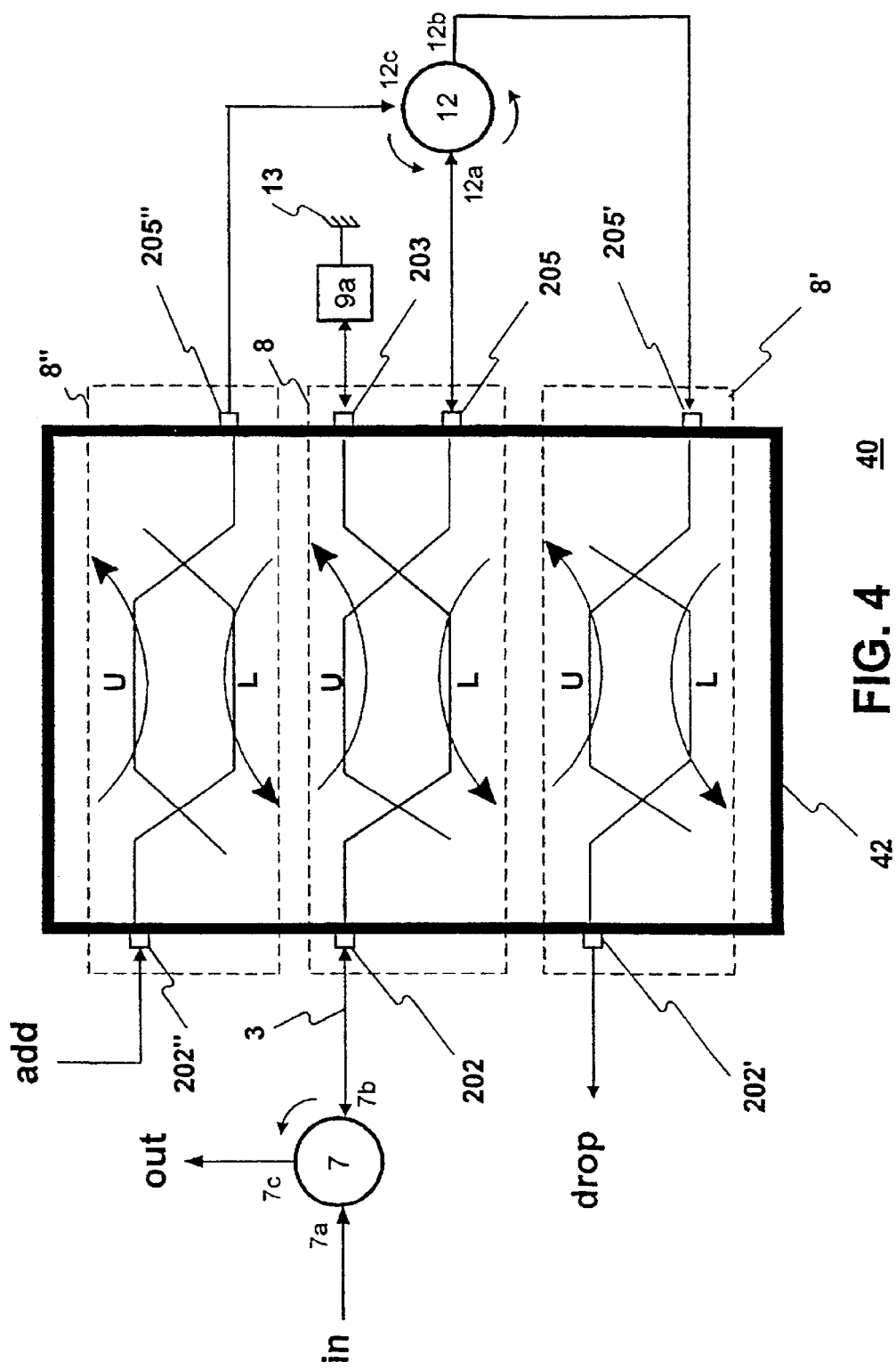
FIG. 4 is a schematic diagram of a wavelength selective optical cross-connect consistent with another embodiment of the present invention having double-pass add, drop, and notch filters.

FIG. 4 is a schematic diagram of another embodiment of a multiplexer of the present invention having three acousto-optical switches integrated on the same substrate. In this embodiment, switches 8 and 8' of the device 30 in FIG. 3 remain substantially the same, while a third acousto-optical switch 8" has been added for switching the polarization modes of the added channels prior to their introduction into port 12c of circulator 12. The multiplexer of FIG. 4 provides double-stage filtering for each of the line channels, added channels and dropped channels, which can give high performance, for example, at 200 GHz channel spacing.

More particularly, multiplexer 40 includes an optical port 202" for introducing channel wavelengths for adding to a wavelength-division-multiplexing system, for example, coupled to circulator 7 and/or drop port 202'. Switch 8" is preferably driven by RF generator 6 (not shown), which also drives switches 8 and 8'. Therefore, switch 8" converts the polarization mode of the added channels that enter optical port 202". As discussed above for switch 8 in FIG. 1, this conversion will include a frequency shift for the channels exiting switch 8" at optical port 205" and entering circulator port 12c. The second passage through multiplexer 40 for the added channels will occur through switch 8, which will again convert the polarization mode of the wavelengths so that they recombine at output port 202. Circulator 7 routes the added channels into the external communication system, not shown. With multiplexer 40 of FIG. 4, the second passage of the added channels through substrate 42 causes a frequency shift in the channels equal to that introduced during the first pass through switch 8" but with the opposite sign. As a result, for multiplexer 40 both the added and the dropped channels undergo a double passage through the device that culminates in no total frequency shift for the channels in either case.

As with the double-switch embodiment of FIG. 3, the three switches of FIG. 4 may be incorporated on the same substrate or different substrates. Variations to the general architectures of FIG. 3 and FIG. 4 to achieve double passage for dropped and/or added channels with optimized performance are within the skill of the artisan.

In each of the previously disclosed embodiments of FIGS. 1, 3, 4 coupling of the external reflecting device via a fiber to the substrate of the switch 8 allows other components to be easily inserted in the branch between port 203 and reflecting device 13. An optical power splitter (for example a 90:10 or 95:5 fused fiber splitter) coupled between the substrate and reflecting device 13 allows performance monitoring of the device during operation. Moreover, if a need arises to track signal wavelength drifts, a feedback loop can be set up, including an opto-electric transducer coupled to the power splitter and suitable feedback electronics controlling the radio frequencies produced by generator 6.

Figure 5A:
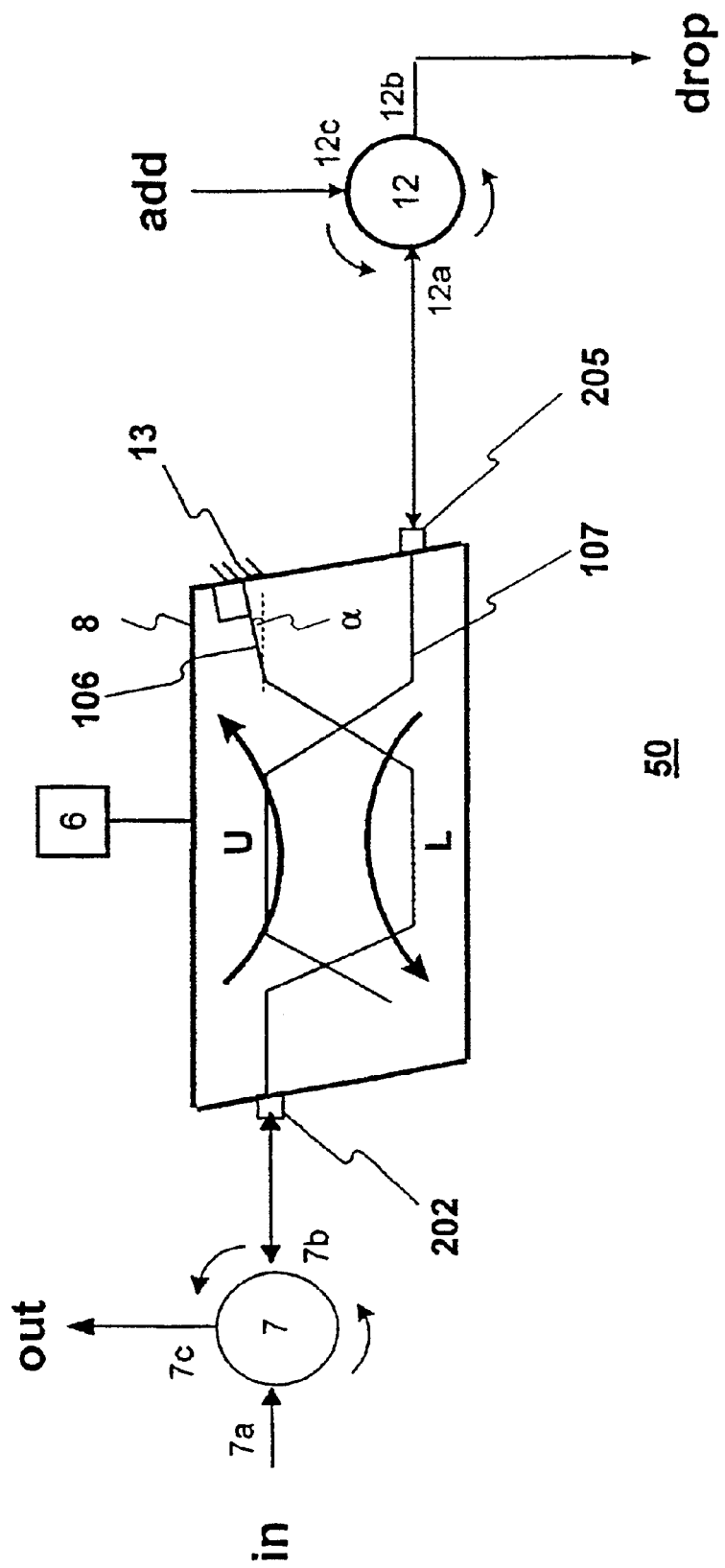
FIGS. 5A and 5B are schematic diagrams of other acousto-optical switches for use in the add/drop multiplexers of the present invention.

FIG. 5A schematically illustrates another embodiment of the present invention of an add/drop multiplexer using an acousto-optical switch where reflecting device 13 is integrated with the substrate of switch 8. For example, reflecting device 13 in FIG. 5A may comprise a deposited layer of metal, as gold or aluminium, on the endface of the LiNbO$_3$ at the end of optical waveguide 106. In conventional substrates, end-faces of the waveguide are typically slant-polished at about 6° to avoid any back-reflection from the end-face. To maintain slanting for the drop-output at port 205 and simultaneously allow an orthogonal incidence to the end-faces for the line path near port 203, the end-faces are slant-polished and optical waveguide 106 is curved so as to end at an angle a of about 6° with respect to the axis of waveguides 119 and 120. Accordingly, optical waveguide 106 crosses perpendicularly with the end-face of the substrate and with reflecting device 13.

Figure 5B:
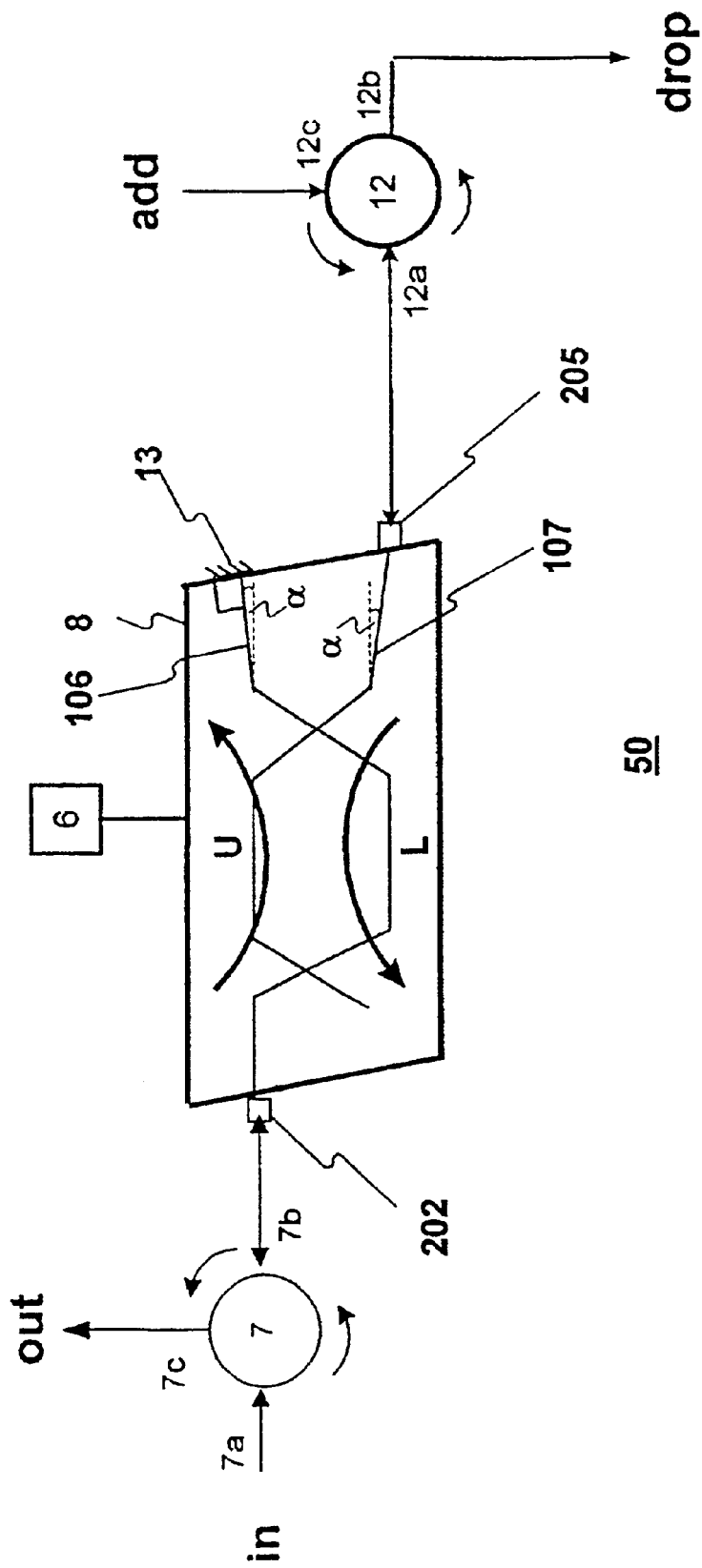

FIG. 5B schematically shows another embodiment of the present invention similar to that in FIG. 5A except for a change in the layout of optical waveguides 106 and 107.

In the embodiment of FIG. 5B, the curvature of the optical paths is shared between both waveguides 106 and 107.

In more detail, in the embodiment of FIG. 5B waveguides 106 and 107 are curved so as to end at an angle a of about 3° with respect to the axis of waveguides 119 and 120, but with opposite directions. In this embodiment, the substrate end-faces are slant-polished at about 3°. Accordingly, waveguide 107a and the substrate end-face form an angle of 6° (so as to avoid back-reflection) and, at the same time, waveguide 106 crosses perpendicularly with the end-face of the substrate and with reflecting device 13.

In this manner, the space needed for the curved waveguides on the substrate can be significantly reduced. In particular, the total length of the substrate section that is needed for the waveguides 106 and 107c an be reduced by half (e.g., from about 10 mm to about 5 mm).

Of course, one of ordinary skill in the art can readily choose different angles or integrate waveguide kinks to minimize the space and size of the substrate. All of the previously disclosed embodiments of FIGS. 1–4 may alternatively use the integrated 46mirror techniques of FIGS. 5A and 5B.

In another embodiment of the present invention, acousto-optical add/drop multiplexers may be arranged in a manner to achieve a wavelength selective cross-connect between a plurality of optical communication lines. In general, such a wavelength selective optical cross-connect includes at least two acousto-optical switches each including a first polarization splitter, a wavelength-selective polarization conversion stage coupled between the first polarization splitter and a second polarization splitter, a reflecting device coupled to one arm of the second polarization splitter, and a circulator having an input port for receiving line channels, a switch port coupled to the first polarization splitter, and an output port. The optical cross-connect further includes an optical path that couples second arms of the second polarization splitters in the respective acousto-optical switches.

Figure 6:
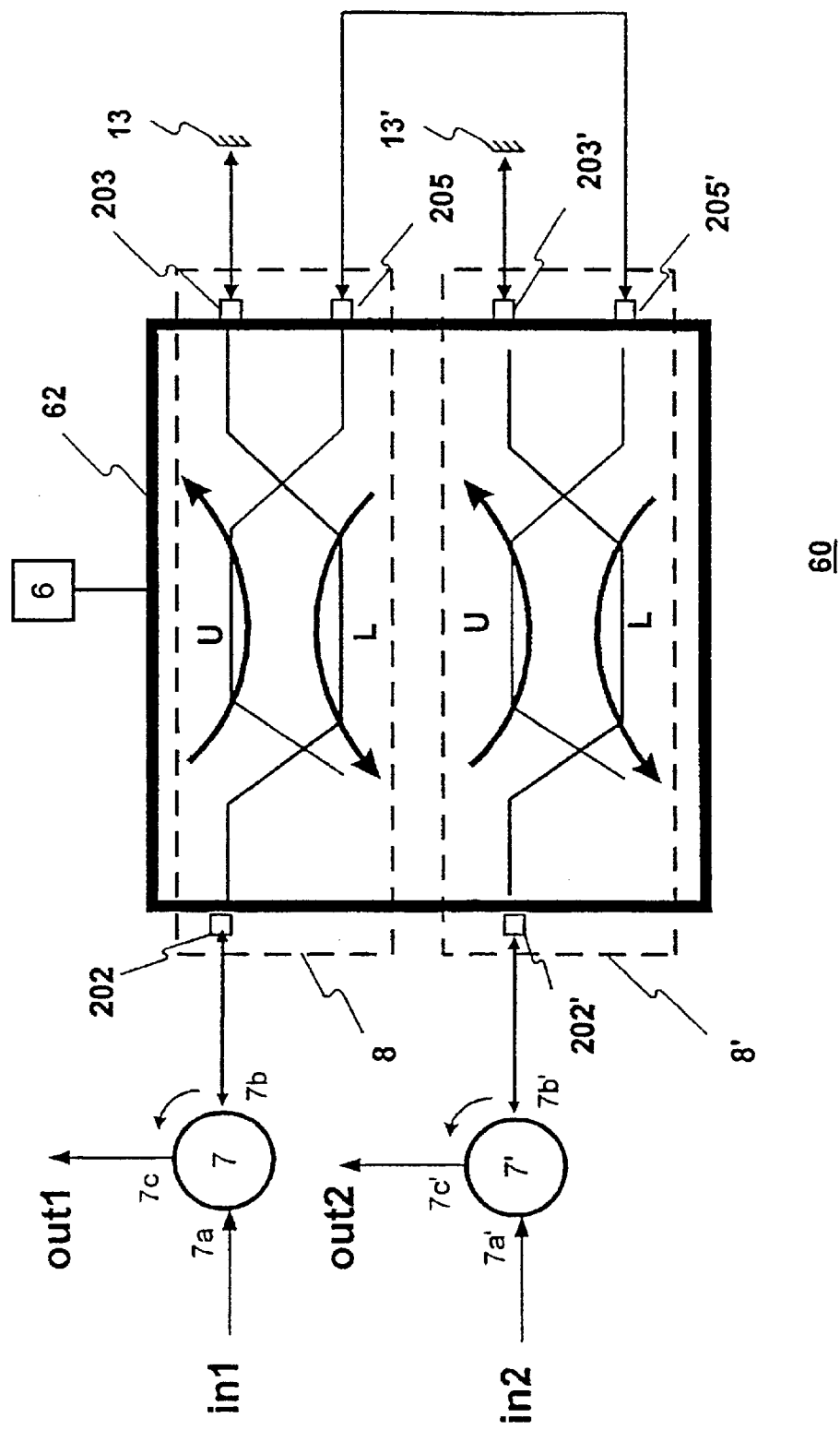
FIG. 6 is a schematic diagram of a wavelength selective optical cross-connect consistent with the present invention including two acousto-optical switches integrated on a common substrate.

As embodied in FIG. 6, a wavelength selective optical cross-connect 60 consistent with the present invention includes acousto-optical switches 8 and 8' integrated on a common substrate 62. Each switch preferably has an architecture similar to that described for multiplexer 10 in FIG. 1, with the exception of circulator 12 of FIG. 1 that can be omitted here. Additionally, an optical path such as an optical fiber connects port 205 in switch 8 with port 205 in switch 8'. Also, circulator 7' provides an interface device to switch 8' via optical port 202'. Circulator 7', like circulator 7, has at least three ports where a first port provides line channels to the cross-connect, a second port couples the circulator 7' to switch 8', and third port 7c'0 serves as an output.

In operation, cross-connect 60 permits the switching of a channel selected by RF generator 6 between the respective line channels received at ports 7a and 7a'. Port 7a can be coupled to an external communication system and receive, for example, a plurality of wavelength-division-multiplexed channels. Port 7a' can receive similar channels from a different system, or a subset of channels from the same system, for instance. Each of the channels received at port 7a that do not correspond to the wavelength selected by RF generator 6 are not switched within device 8 and, therefore, pass through optical port 203 back to port 202 and port 7c of circulator 7, in a manner described above for FIG. 1. The channel or channels that do coincide with the selection made by RF generator 6 are switched from the line channels and exit device 8 through optical port 205. Similar operation occurs for the line channels received at port 7a' for entry to switch 8'.

As a result, switched channels from device 8 enter port 205' in device 8' and are multiplexed into the line channels in device 8' via upper and lower converters U and L. Optical port 202' and then circulator port 7c' provides an exit path for a combination of the line channels introduced at port 7a' and the added channel(s) from switch 8 that enters optical port 205'. Similarly, optical port 202 and then circulator 7c provides an exit path for a combination of the line channels introduced at port 7a and the added channel(s) from switch 8' that enters optical port 205.

In the optical crossonnect of the present invention, several advantages arise. For one, the multiple switches 8 and 8' can be implemented, as mentioned, on a single substrate 62, which permits simplified packaging with a common temperature control and possibly a single RF drive (such as 6). The homodyne crosstalk in the case of signal exchange is better than 30 dB. As well, when the device 60 is switched off, isolation between the lines is about 40 dB, corresponding to about the sum of the two single add/drop devices' isolation of 20 dB.

In accordance with the present invention, the acousto-optical add/drop multiplexers and cross-connect switches of the previous discussion may include structure for compensating polarization mode dispersion (PMD) that arises in unconverted and unswitched optical wavelengths. EP 805372A1 provides a background of PMD and techniques for minimizing its effects in acousto-optical switches. In general, PMD arises from the difference in propagation times, or phase displacement, of the two polarization modes of an optical signal that encounter the two indices of refraction $n_o$ and $n_e$ of the birefringent LiNbO$_3$ substrate. Such a device introduces a time delay between the signal components in both polarizations that depends on the total length L of the device. The time delay is in general given by:

$$\Delta t = L \cdot (n_o - n_e)/c = L \cdot \Delta n/c, \quad (1)$$

where c is the velocity of light in a vacuum. In an x-cut, y-propagation LiNbO$_3$ substrate, an $\Delta n \cong 0.072$ ($n_e = 2.154$; $n_o = 2.226$) so that a PMD delay is 15.5 ps in a 65 mm device if no polarization conversion is performed. In a double-pass configuration, the PMD sums up to 31 ps.

However, in high-speed digital optical telecommunications networks (10 Gbit/sec), the temporal distance between two successive pulses (bits) of a signal can be on the order of 50 ps. A phase displacement of the two polarization components of the same bit (splitting) of a value of 15 ps (or with a higher value in the case of devices arranged in cascade) can cause superimpositions or overlapping between successive bits. This circumstance can degrade the quality of transmission including in terms of the bit error rate (BER). To avoid introducing degradation at high bit rates ($\geq 2.5$ Gbit/s), the PMD should in be in the order of 1 ps, especially if other components contribute to the total PMD of the transmission line. Consequently, the present invention contemplates the use of polarization controlling devices that minimize the PMD delay within the LiNbO$_3$ substrate for optical wavelengths that do not undergo polarization conversion within the acoustic waveguides.

As a result, the acousto-optical add/drop multiplexer of the present invention may include a polarization converter for compensating PMD of unconverted optical signals within the multiplexer.

As embodied herein, the polarization converter can comprise one or more birefringent elements that introduce the same time-delay according to formula (1) but with an opposite sign so as to compensate PMD. Such birefringent elements can be, for example, birefringent fibers (e.g. polarization-maintaining fibers) or birefringent crystals.

The axis of the birefringent fibers or the birefringent crystal must be properly oriented with respect to birefringence axis of the device. In general, the "fast" axis (the axis with the lower refraction index) will be parallel to the device's "slow" axis, and vice versa.

Suitable birefringent optical fibers of the type with polarization maintenance are, for example, PANDA™ fibers including internal tension elements, fibers with an oval inner cladding, and the like. A PANDA™ fiber suitable for the wavelength of 1550 nm is Fujikura SM(C) 15-P. The transversal cross-section of these fibers have an axis called "slow" and an orthogonal axis called "fast." Signals with polarization parallel to the slow axis propagate according to a first index of refraction, with a speed lower than the signals having a polarization parallel to the fast axis of the fiber.

For a birefringent crystal, an ideal candidate is LiNbO$_3$ itself because its birefringence is well determined and the needed lengths to compensate for the PMD correspond to the device length itself. In a z-cut, y-propagation LiNbO$_3$ substrate, the axes of the birefringence are exchanged compared to an x-cut, y-propagation device. Optical waveguides for the PMD crystal can be produced with the same technique used for the add/drop device itself, and the crystal can be attached directly to the device without inducing significant additional loss. Hence, such a substrate is ideal to introduce the external compensating PMD. To compensate for the time delay generated within a length L of an x-cut, y-propagation LiNbO$_3$ substrate, a polarization-mode-dispersion compensator of a z-cut, y-propagation LiNbO$_3$ substrate positioned in the optical path of the unconverted signals will also have the length L.

PMD compensation is not required for optical signals within add/drop multiplexer 10 that undergo a polarization conversion TE→TM or TM→TE within upper converter L or lower converter U. Upon the conversion taking place about half way along the optical path integrated on the substrate 10, the slow and fast polarization components change over with one another in the respective optical paths. As a result, the polarization mode dispersion is compensated inside the substrate 10, and no polarization mode dispersion arises for these converted signals.

Figure 7:
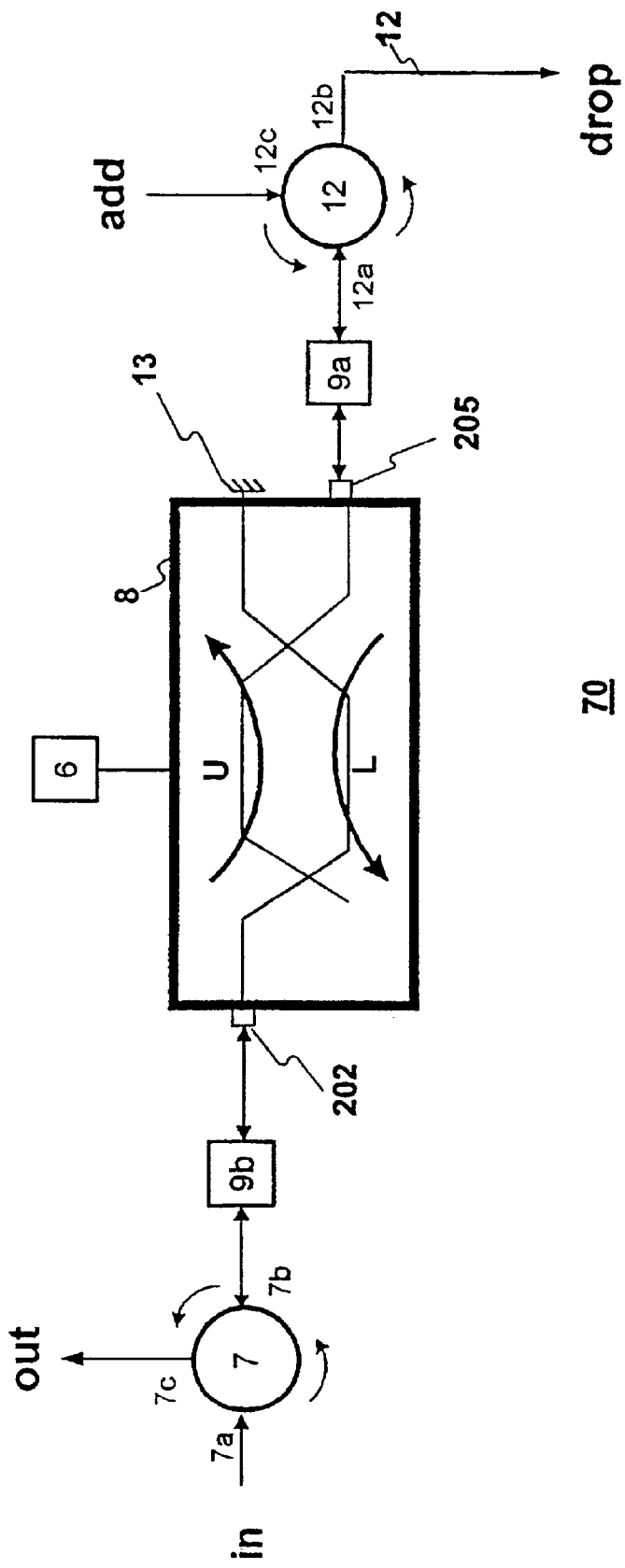
FIG. 7 is a schematic diagram of an add/drop multiplexer consistent with another embodiment of the present invention including polarization mode dispersion compensation.

To accommodate the situation where nonconverted optical signals require PMD compensation while converted optical signals do not, the present invention contemplates numerous arrangements of polarization-mode-dispersion compensator(s) within add/drop multiplexer 10. More particularly, PMD compensators are selected and positioned such that the sum of the PMD compensation from all PMD compensators counteracts the time delay added to the unconverted optical signals passing through switch 8 but does not affect the converted optical signals. FIGS. 1 and 7 provide examples of preferred arrangements of PMD compensators 9a and 9b in the add/drop multiplexer of the present invention.

In FIG. 1, PMD compensator 9a is coupled in the optical path between port 203 and reflecting device 13. PMD compensator 9a may be a birefringent element as described above that provides for complete compensation of the time delay $\Delta t$ present in the converted optical signals that exit switch 8 at port 202. That is, if the LiNbO$_3$ substrate of switch 8 introduces a time delay +$\Delta t/2$ for each pass through switch 8, PMD compensator 9a would preferably compensate the delay by an amount −$\Delta t/2$ for each pass through it so that the unconverted wavelengths that exit port 202 will have a total phase shift of $\Delta t = 0$ after two passes through switch 8 and PMD compensator 9a. Consequently, PMD compensator 9a could be another LiNbO$_3$ substrate having a length equal to the length of the substrate of switch 8 or a PANDA™ fiber having an equivalent compensation capability.

FIG. 7 illustrates an alternative configuration 70 for switch 8 in a situation, for example, like FIG. 3 where the reflecting device 13 is integrated in the substrate of switch 8. As shown in FIG. 7, the add/drop multiplexer of this embodiment can include PMD compensators 9a and 9b split between ports 205 and 202. If the LiNbO$_3$ substrate of switch 8 introduces a time delay +Δt/2 for each pass through switch 8, then PMD compensator 9b compensates a phase shift of value −Δt, and PMD compensator 9a compensates a phase shift of value +Δt. In this manner, all optical wavelengths entering switch 8 via port 202 pass through PMD compensator 9b and undergo a phase shift of −Δt. Mirror 13 reflects the optical wavelengths that are not selected and converted along waveguides 119 and 120 back out port 202. These exiting unconverted signals have undergone a time shift of +Δt after two passes through switch 8, which a second pass through PMD compensator 9b counterbalances to yield Δt=0 for the unconverted wavelengths.

The wavelengths that are selected and converted in polarization along waveguides 119 and 120 exit switch 8 at port 205 in FIG. 7 without further phase shift. PMD compensator 9a then shifts the phase of these wavelengths by a value +Δt equal and opposite to the amount introduced by PMD compensator 9b, which yields Δt=0 for the converted wavelengths that enter circulator 12. Of course, PMD compensators 9a and 9b may be implemented with any of the known birefringent devices such as the birefringent fibers and crystals described above. As well, the arrangement for PMD compensation illustrated in FIGS. 1 and 7 can be equally extended to the double-pass embodiments of FIGS. 3, 4, and 6 and the integrated mirror embodiment of FIGS. 5A and 5B by one of ordinary skill in the art.

According to a further embodiment, a polarization converter 9a to compensate PMD in a device as disclosed with reference to any of FIGS. 1, 3–6 can include a Faraday-rotator or a quarter waveplate, as described in the following.

The Faraday rotator is preferably such to rotate the polarization by 45° in a single-passage. In this case, light leaving switch 8 from port 203 passes twice through the Faraday rotator, because of the reflection on mirror 13, and undergoes an overall polarization rotation of 90°.

For example, TE light entering from port 202 and passing unconverted through the lower converter L, exits from port 203. After polarization rotation by the Faraday rotator, reflection and further polarization rotation, TM light enters again port 203, passes unconverted through the upper converter U and exits from port 202. TM light entering the switch 8 by port 202 follows a corresponding optical path through upper converter U and successively, rotated to TM light, through lower converter L.

In this way each input polarization component is converted to the orthogonal polarization component (by the Faraday rotator and reflecting device 13) halfway in its double-pass through the device and, hence, the paths followed by the two polarization components have a same total length. As a result, polarization mode dispersion is compensated. Moreover, PDL (polarization dependent loss) is also compensated.

Suitable Faraday rotators are for example made by Princeton and E-TEK. Faraday rotators directly attached to a mirror are available as a single package, in a configuration known as Faraday rotating mirror.

The same results can be achieved by using a quarter wave plate placed along the optical path between port 203 and reflecting device 13. In fact, the double passage of light through the quarter wave plate causes a polarization rotation of 90°. A quarter wave plate can be attached to the end-face of the switch 8 with a 45° orientation with respect to the substrate crystal axis. Furthermore, the surface of the quarter wave plate opposite to port 203 can be made reflecting by a conventional technique and thus no separated reflecting device is required. Alternatively, the quarter-wave plate can be connected to port 203 by a polarization maintaining fibers. Quarter wave plates for use in the present invention are available, for example, from Melles Griot or from Spindler +Hoyer.

Applicants have determined that, for the optical signals that do not undergo a polarization conversion within switch 8, devices according to the present invention that use the Faraday rotator or the quarter wave plate are independent from the light polarization.

Constructing any of the add/drop multiplexers and optical cross-connects of FIGS. 1–7 is within the knowledge of one of ordinary skill in the art. For example, EP 768555A1 and EP 805372A1 describe techniques for making acusto-optical switches such as reference 8 using $LiNbO_3$, diffusing waveguides onto such a substrate and depositing electrodes.

Overall, the present invention provides numerous advantages for add/drop multiplexing and selective cross-connecting in an optical communications environment. These advantages include a smaller 3-inch wafer technology sufficient for 200 GHz-channel spacing due to reduced space, and significantly reduced insertion losses (lower than about 5 dB for reflected line signals, i.e., signals other than added or dropped signals, if reflecting device 13 has a sufficiently high reflectivity). If the acousto-optical switch includes a fourth optical port (such as port 1204 in FIG. 2), the fourth output can be used for other purposes, such as monitoring of the switching state, multiplexing with other wavelength channels, monitoring of single wavelength channels and so on.

In addition, the structure of the present invention provides greater than 30 dB extinction for notched channels compared with known add/drop multiplexers. Because the mirror is integrated with the chip in certain embodiments, insertion losses caused by pigtailing can be reduced by half. Also, in the embodiments that use double-pass for the line and single-pass for added and dropped channels, the pigtailing is much simpler and cheaper. There is only one fiber needed in the input and one in the output (1×1 pigtailing), hence alignment is much more simple and precise compared with 2×2 pigtailing in conventional switches and multiplexers that must use all optical ports of the acousto-optical device.

A further important advantage of the 1×1 pigtailing is the reduced space needed to connect the integrated polarization splitters to the fiber. The maximum usable length of a single chip (about 65 mm) is limited by the wafer diameter, which currently is 3 inches. As mentioned above, on the chip a relatively long section of about 20 mm (i.e., twice 10 mm) is needed to connect the optical guides of the converter (spaced apart by about 270 μm) to the fiber pair at the endface (spaced apart by about 250 μm) via the integrated polarization splitters. In general, the total length of a 0.9 nm FWHM (Full Width at Half Maximum) filter needed for 200 GHz WDM channel spacing is then between 80 mm and 85 mm (a 0.9 nm FWHM-converter has a length of about 40–45 mm). This would make a 4-inch wafer technology necessary for 2×2 fiber coupling.

The reduction to only one fiber per end-face reduces the length of the connecting section to about half, and the chip length no longer exceeds 65 mm. This remains valid also if the parallel filter stages for the drop and add are integrated as in FIGS. 3 and 4, and if the mirror is integrated on the chip. In general, the 1×1 pigtailing allows a space reduction and provides room for an optimization of other characteristics, for instance reducing the bandwidth by extending the converters. However, even by doing so, the 3-inch technology is sufficient for a 0.9 nm FWHM filter.

It will be apparent to those skilled in the art that various modifications and variations can be made to the system and method of the present invention without departing from the spirit or scope of the invention. For example, the add/drop configurations are intended to be merely exemplary of preferred embodiments, and not exhaustive. Further, those skilled In the art will recognize that, in the absence of circulator 12 that helps to perform the add/drop function, the device disclosed herein, e.g., with reference to FIGS. 1, 5A, 5B, 7 constitutes a novel double-passage band-reject optical filter, which may be used as suggested and disclosed in EP 98118377.5. In particular, optical signals are input at port 7a of circulator 7 and output at port 7c of the same circulator.

Furthermore in device disclosed herein, e.g., with reference to FIGS. 1, 5A, 5B, 7, circulator 12 can be substituted by another reflecting device. A novel wavelength selective frequency shifter is so obtained, that shifts, among the wavelengths input at port 7a of circulator 7, only the signals selected by the radio frequency. The wavelength shift is by an amount corresponding to the radio frequency itself.

According to a further, alternative embodiment, in the device disclosed herein, e.g., with reference to FIGS. 1, 5A, 5B, 7, circulator 12 is substituted by a reflecting device and reflective device 13 at the output of port 203 is removed. In this embodiment the device behaves as a novel double-passage band-pass optical filter.

The present invention covers the modifications and variations of this invention provided they come within the scope of the appended claims and their equivalents.

What is claimed is:

1. An acousto-optical add/drop multiplexer, comprising:
    an acousto-optical switch on a birefringent and photoelastic substrate, the acousto optical switch comprising:
        a first optical port on a substrate coupled to a first polarization splitter;
        a first acousto-optical polarization conversion region (U) including a first optical waveguide branch optically coupled between the first polarization splitter and a second polarization splitter;
        a second acousto-optical polarization conversion region (L) including a second optical waveguide branch optically coupled between the first polarization splitter and a second polarization splitter;
        second and third optical ports coupled to the second polarization splitter,
    a first circulator having, in order of rotation, an input port, a switch port coupled to the first optical port, and an output port;
    a reflecting device coupled to the second optical port; and
    a second circulator having, in order of rotation, a filter port coupled to the third optical port, a drop port, and an add port.

2. The acousto-optical add/drop multiplexer of claim 1, wherein the first polarization splitter has cross and bar transmission, respectively, for orthogonal polarization components of received light.

3. The acousto-optical add/drop multiplexer of claim 1, further comprising:
    a first transducer within the acousto-optical switch acoustically coupled to the first polarization conversion region and to an RF source, the first transducer generating a first acoustic wave in the first polarization conversion region having a characteristic frequency determined by the RF source.

4. The acousto-optical add/drop multiplexer of claim 3, further comprising:
    a second transducer within the acousto-optical switch acoustically coupled to the second polarization conversion region and to the RF source, the second transducer generating a second acoustic wave in the second polarization conversion region having its characteristic frequency with a propagation direction opposite to a propagation direction of the first acoustic wave.

5. The acousto-optical multiplexer of claim 1, wherein the reflecting device is coupled to the second optical port via an optical fiber.

6. The acousto-optical add/drop multiplexer of claim 1, wherein the reflecting device is integrated on a substrate at the second optical port.

7. The acousto-optical add/drop multiplexer of claim 6, wherein an edge of a substrate at the second and third optical port is slant-polished and an optical waveguide coupled to the second optical port within the substrate is positioned substantially-normal to said edge.

8. The acousto-optical add/drop multiplexer of claim 1, further comprising:
    a polarization-mode-dispersion compensator coupled between the reflecting device and the second optical port.

9. The acousto-optical add/drop multiplexer of claim 8, wherein the polarization-mode-dispersion compensator is a birefringent element.

10. The acousto-optical add/drop multiplexer of claim 9, wherein the birefringent element is one of a polarization-maintaining fiber and a birefringent crystal.

11. The acousto-optical add/drop multiplexer of claim 8, wherein the polarization-mode-dispersion compensator is one of a Faraday rotator and a quarter-wave plate.

12. The acousto-optical add/drop multiplexer of claim 1, further comprising:
    a first polarization-mode-dispersion compensator coupled between the filter port of the second circulator and the third optical port of the switch; and
    a second polarization-mode-dispersion compensator coupled between the switch port of the first calculator and the first optical port of the switch.

13. The acousto-optical add/drop multiplexer of claim 1, further comprising:
    a second acousto-optical switch formed on the same substrate as the acousto-optical switch comprising:
        a fourth optical port coupled to the drop port of the second circulator,
        third and forth polarization conversion regions (U,L), respectively, optically coupled between third and fourth optical polarization splitters, and
        a fifth optical port coupled to the fourth optical splitter.

14. The acousto-optical add/drop multiplexer of claim 13, further comprising:
    a third acousto-optical switch formed on the same substrate as the acousto-optical switch, comprising:
        a sixth optical port coupled to the add port of the second circulator,
        fifth and sixth polarization conversion regions (U,L), respectively, coupled between fifth and sixth optical polarization splitters, and a seventh optical port coupled to the fifth optical splitter.

15. A method of multiplexing optical channels, comprising the steps of:
    providing a line optical channel at a first wavelength to an acousto-optical switch having a first polarization splitter and a polarization conversion stage connected between the first polarization splitter and a second polarization splitter;
    switching said line optical channel to a first arm of the second polarization splitter;

reflecting said line optical channel back through the switch via the first arm;

adding to a second arm of the second polarization splitter a new channel at a wavelength different from said first wavelength; and combining the new channel and the line optical channel at an output of the switch coupled to the first polarization splitter.

16. The method of claim 15, wherein the adding step comprises the substep of:

separating said new channel from a different plurality of optical channels in another acousto-optical switch.

17. A method of dropping optical channels, comprising the steps of:

providing a plurality of optical channels to an acousto-optical switch having a first polarization splitter and a polarization conversion stage connected between the first polarization splitter and a second polarization splitter;

switching at least one of the optical channels to a first arm of the second polarization splitter and other of the optical channels to a second arm of the second polarization splitter;

reflecting the other of the optical channels back through the switch via the second arm; and dropping said at least one of the optical channel from said first arm of the second polarization splitter.

18. The method of claim 17, wherein the dropping step comprises the substep of:

passing the at least one of the optical channels to another acousto-optical switch for addition to a different plurality of optical channels.

* * * * *